United States Patent [19]

Shumway

[11] Patent Number: 5,671,955
[45] Date of Patent: Sep. 30, 1997

[54] THREADLESS PIPE COUPLER FOR SPRINKLER PIPE

[75] Inventor: Paul W. Shumway, Avondale, Ariz.

[73] Assignee: American Fence Corporation, Phoenix, Ariz.

[21] Appl. No.: 489,106

[22] Filed: Jun. 9, 1995

[51] Int. Cl.[6] ............................................. F16L 37/092
[52] U.S. Cl. ................................................. 285/305; 285/321
[58] Field of Search .......................... 285/305, 321, 285/276, 374; 403/326, 327

[56] References Cited

U.S. PATENT DOCUMENTS

| | | |
|---|---|---|
| 472,342 | 4/1892 | Draudt et al. . |
| 497,374 | 5/1893 | Hay . |
| 738,503 | 9/1903 | Waters . |
| 1,073,850 | 9/1913 | Greer . |
| 2,440,452 | 4/1948 | Smith . |
| 2,525,667 | 1/1950 | Goolsbee et al. . |
| 2,760,258 | 8/1956 | Rieger . |
| 2,805,089 | 9/1957 | Hansen . |
| 3,079,188 | 2/1963 | Oswold ........................ 285/321 X |
| 3,177,019 | 4/1965 | Osweiler . |
| 3,414,299 | 12/1968 | Roe . |
| 3,637,239 | 1/1972 | Daniel . |
| 3,718,350 | 2/1973 | Klein . |
| 3,860,742 | 1/1975 | Medney ....................... 285/305 X |
| 4,087,120 | 5/1978 | Ramble . |
| 4,113,288 | 9/1978 | Cox . |
| 4,138,146 | 2/1979 | Rumble . |
| 4,186,946 | 2/1980 | Snow ........................... 285/305 X |
| 4,293,148 | 10/1981 | Milberger .................... 285/305 |
| 4,304,424 | 12/1981 | Hansen . |
| 4,401,324 | 8/1983 | Rumble . |
| 4,570,980 | 2/1986 | Goward . |
| 4,611,837 | 9/1986 | Aleck . |
| 4,679,825 | 7/1987 | Taylor . |
| 4,707,000 | 11/1987 | Torgardh . |
| 4,768,587 | 9/1988 | Halder . |
| 4,783,100 | 11/1988 | Klein ........................... 285/276 |
| 4,804,206 | 2/1989 | Wood et al. . |
| 5,002,318 | 3/1991 | Witter . |
| 5,080,521 | 1/1992 | Quaile ......................... 285/321 X |
| 5,098,241 | 3/1992 | Aldridge et al. . |
| 5,226,682 | 7/1993 | Marrison et al. . |
| 5,419,594 | 5/1995 | Nelms .......................... 285/321 X |
| 5,490,694 | 2/1996 | Shumay ....................... 285/305 |

Primary Examiner—Terry Lee Melius
Assistant Examiner—Heather Shackelford
Attorney, Agent, or Firm—O'Connor Cavanagh; Donald J. Lenkszus

[57] ABSTRACT

A pipe coupler for use in fire sprinkler systems is of generally cylindrical shape. The coupler carries locking springs to engage grooves carried on the ends of the sprinkler pipes. The coupler also carries seal rings to provide for leak proof coupling. Each locking spring is carried in a groove in the coupler which has its sidewalls inclined to the inner surface of the coupler. Axial movement of the pipe in either direction relative to the coupler produces a wedging or camming action between the locking spring and the sidewall of the coupler groove and the sidewall of the pipe groove.

5 Claims, 1 Drawing Sheet

THREADLESS PIPE COUPLER FOR SPRINKLER PIPE

BACKGROUND OF THE INVENTION

1. Related Applications

This application is related to my prior application, Ser. No. 08/397,920 filed Mar. 3, 1995, titled THREADLESS PIPE COUPLER.

2. Background of the Invention

This invention pertains to piping systems utilizing threadless coupling, in general, and to threadless couplers for building fire sprinkler systems, in particular.

Pipe sections which must be joined together to form a run of pipe for the flow of fluids therein must be free from leakage. Considerable care must be employed in selecting fittings which will properly form joints or couple adjacent sections of pipe. In addition, the fittings must securely fit and grip the pipe in a straight and leak free relationship.

These problems are particularly apparent in pipe runs which are utilized in building fire sprinkler systems. In these applications, the joined sections of pipe must be straight and aligned to prevent twisting and longitudinal separation.

It is desirable to provide an arrangement wherein pipe connections can be accomplished quickly and at relatively low cost.

Several arrangements have been proposed in the past to provide coupling arrangements. For example, in U.S. Pat. No. 4,304,424, an arrangement is described in which plain ends of pipe are connected with a coupler having a cutting member which penetrates the surface of the pipe.

It has been found that this is not a desirable coupler and therefore, it is one object of this invention to provide an improved coupler which easily and quickly connects adjacent pipe ends in an end to end or confronting relationship along a straight line.

It is another object of the present invention to provide a coupler wherein conventional tooling may be used to aid in the installation process.

SUMMARY OF THE INVENTION

A coupler in accordance with the principles of this invention comprises a generally cylindrical body which receives the ends of the pipes to be coupled.

The ends of the pipes to be coupled each have a circumferential groove formed on the exterior surface.

The coupler includes at each pipe receiving end an internal circumferential groove which carries a split locking spring or lock ring. Each circumferential groove receiving a locking spring in the coupler has its sidewalls inclined to the interior surface of the pipe. The circumferential groves in the coupler are of such a depth so that the locking spring may be forced into the groove so that a pipe then can pass over the locking spring. The locking spring is preformed such that when the corresponding rectangular groove in the pipe end is in alignment with the locking spring, the locking spring will engage the groove on the pipe as well as a portion of the groove on the coupler to prevent longitudinal separation of the pipe. After the pipes and coupler are assembled, the locking ring will engage a sidewall of the pipe groove as well as a sidewall of the coupler groove to limit axial movement of the pipe relative to the coupler. With both sidewalls of the groove in the coupler inclined, axial movement between the pipe and coupler in either direction results in a camming or wedging action of the lock ring.

The coupler also includes seals which are each carried in an internal circumferential groove spaced inwardly from each locking spring. Each seal provides a fluid tight seal with the end of the pipe.

With this arrangement, pipe ends may be quickly snap connected together to provide a highly reliable and quick installation of a fire sprinkler system.

BRIEF DESCRIPTION OF THE DRAWINGS

The invention will be better understood from a reading of the following detailed description taken in conjunction with the drawings in which.

DETAILED DESCRIPTION

Figure 1:
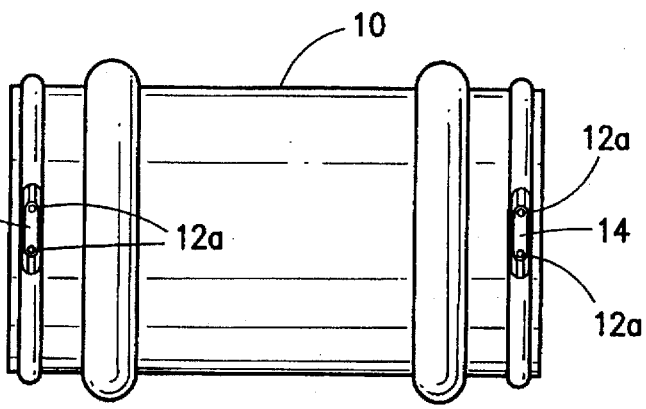
FIG. 1 illustrates a coupler in accordance with the principles of the invention utilized to connect together two pipes.
Figure 2:
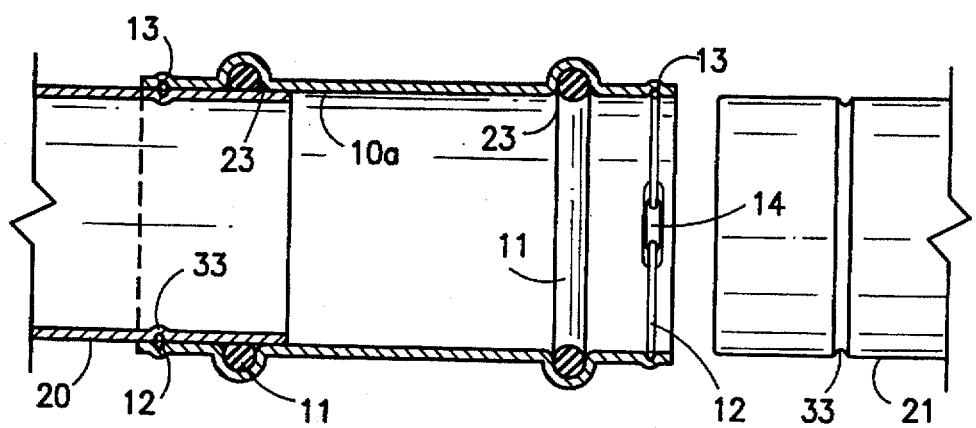
FIG. 2 is a cross section of the coupler of FIG. 1 with one pipe in cross section inserted into the coupler and a second pipe positioned for insertion into the coupler.

Turning now to FIGS. 1 and 2, a quick connect pipe connector 1 for connecting two pipes together end to end in-line is shown.

Figure 3:
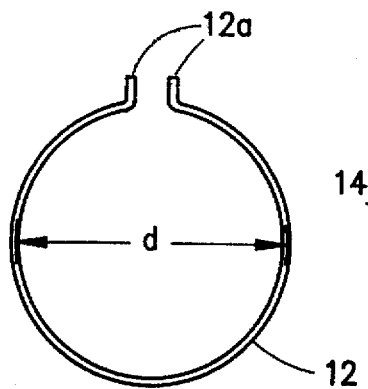
FIG. 3 illustrates a lock ring.

Cold formed into the inner surface 10a at each end of the cylinder 10 is a shaped circumferential groove 13. Formed in each groove 13 is an aperture 14. A split locking spring or split lock ring 12 is carried in each of the grooves 13. The lock ring 12 shown in FIG. 3 has an "at-rest" diameter chosen such that a portion of the lock ring will lie within the groove 13 and a portion of the lock ring 12 will extend out of the groove 13. The lock ring 12 includes arms 12a which are captured in and extend through the aperture 14. When a pipe is to be inserted into the coupler 1, the arms 12a are forced apart in order to urge the lock ring 12 into circumferential engagement with the bottom of the groove 13. The depth of the groove 13 is such that when the lock ring 12 is so spread, the lock ring 12 will be recessed into the groove 13 such that a pipe may be inserted into the coupler 1.

Spaced inwardly of each groove 13 is a groove 23 which is also cold formed into the interior surface 10a. Each groove 23 is of generally semicircular cross section. Assembled into the semicircular grooves 23 are "O" ring seals 11. The "O" ring seals 11 may be of conventional material. Each "O" ring seal 11 is of such a cross sectional diameter that it will extend into the interior of the cylinder 10 above the surface 10a.

As shown in FIG. 2, pipes 20 and 21 may be coupled together by the coupler 1. Each of the pipes 20 and 21 includes a circumferential groove 33 on its outer surface. Each groove 33 is cold formed onto the pipe utilizing conventional commercially available tools. Each of the grooves 33 is of comparable depth and width to the grooves 13 carried on the interior of the pipe coupler 1. As shown in FIG. 2, when a pipe 20 is inserted into the coupler 1, the locking spring 12 engages a circumferential groove 33 on the pipe. In addition, each "O" ring seal 11 will engage the circumference of pipe 20 at the end section of the pipe 20. "O" ring seal 11 deforms, thereby forming a fluid tight circumferential seal between pipe 20 and coupler 1. During insertion of the pipe 20 into the coupler 1, the arms 12a are moved such that the spring 12 rests in groove 13. Pipe 20 can then pass over the locking spring 12. The arms 12a are released and locking spring 12 will ride on the external surface of pipe 20 until groove 23 comes into alignment with the locking ring 12. At that time, the lock ring 12 will snap into a rest position in groove 13 on the pipe coupler 1 and groove 33 on pipe 20. Because the lock ring 12 extends radially into groove 13 as well as groove 33, the lock spring 12 will prevent any significant axial movement of the pipe 20 relative to the coupler 1. With both pipes inserted into coupler 1, the pipes will be connected together in a fluid tight connection.

Figure 4:
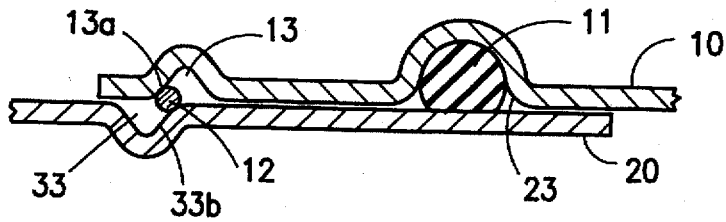
FIGS. 4 and 5 illustrate in enlarged cross section a portion of the coupler and an inserted pipe.
Figure 5:
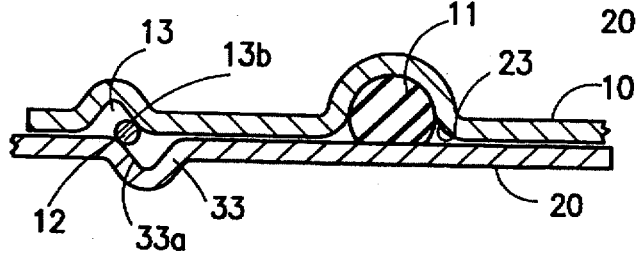

Turning now to FIGS. 4 and 5, the operation of the lock ring 12 in conjunction with the circumferential groove 13 on the coupler 1 and the circumferential groove 33 on pipe 20 or 21 is shown. FIGS. 4 and 5 show in greater detail the upper left hand portion of the pipe coupler 1 shown in FIG. 2. With the pipe 20 fully inserted into the pipe coupler 1, the lock ring 12 is captured between circumferential groove 33 of the pipe and circumferential groove 13 in the pipe coupler 1. The groove 13 is shaped such that its sidewalls 13a and 13b are inclined relative to inner wall 10a of the coupler 1, they form ramps or cam surfaces form ramps along which the lock ring 12 will be carried. As clearly shown in FIG. 4, movement of the pipe 20 to the left relative to the coupler 1 will cause the lock ring 12 to engage the ramp wall 13a of groove 13 and sidewall 33b of groove 33. Because of the inclined surface or ramp shape of the sidewall 13a, a camming or wedging or locking action occurs with any axial force tending to separate the pipe 20 from the coupler 10. Likewise, as shown in FIG. 5, the surface 13b of groove 13 and the surface 33a of groove 33 likewise engage the lock ring 12. Any axial force in a direction to drive the pipe further into the coupler 1 results in a camming or wedging or locking action of the lock ring 12 against the surfaces 13b and 33a. Additional axial forces in the same direction will only act to drive the lock ring 12 in cam like fashion into locking engagement between the surfaces 13b and 33a.

Figure 6:
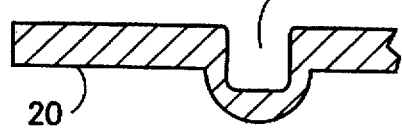
FIGS. 6 and 7 show in cross section alternate grooves which may be utilized on pipe assembled with the connector of the invention.
Figure 7:
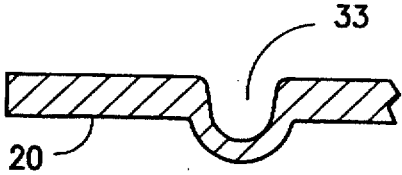

Although in FIGS. 4 and 5 the pipe groove 33 is shown as having ramp like sidewalls, the circumferential groove in pipe 20 may have other shapes such as shown in FIGS. 6 and 7. In FIG. 6, the sidewalls of the circumferential groove 33 are substantially perpendicular to the bottom of the groove. In FIG. 7, the circumferential groove 33 is of generally arcuate or semicircular shape.

Advantageously in the embodiment of the invention shown in the drawings, the lock ring 12 is of circular cross section.

In a sprinkler system utilizing the coupler 1 to connect sprinkler pipe, the coupler 1 provides for a fluid tight connection between sprinkler pipes. With this arrangement, very limited axial movement between the pipe and the coupler can occur. With axial movement of the pipe relative in either direction to the coupler, a camming or wedging action occurs regardless of which axial direction the pipe moves.

Advantageously, the lock rings 12 and the "O" rings 11 are carried by and internal to the coupler. This is particularly advantageous since it is unnecessary for the pipe fitter to assemble either "O" rings or lock rings onto a pipe end before connection as is required in prior fittings. The pipes to be connected require no special tooling and are merely cut to the appropriate length and a groove 33 is cold formed onto the external surface of the pipe.

This arrangement enables sprinkler piping systems to be rapidly assembled and to provide a secure leak tight fitting.

In the illustrative embodiment of the invention, the piping used for the fire sprinkler pipe is a thin walled pipe such as described in my U.S. Pat. No. 5,131,697 issued Jul. 21, 1992 and assigned to a common Assignee.

It should be apparent that the illustrative embodiment of the pipe coupler shown is for connecting two pipes in line. The principles of this invention can easily be applied to other types of connectors such as a "T" connector or multiple pipe connectors or elbows or end caps or any of the conventional pipe coupling shapes which are widely known.

It will be apparent to those skilled in the art that various changes may be made to the structures shown and described herein without departing from the spirit or scope of this invention. It is my intention that such other embodiments be covered by the claims of this invention and that I be limited only by the scope of the claims which are appended hereto.

What is claimed is:

1. A sprinkler system comprising:

a first elongated pipe, said first elongated pipe comprising a first end portion adjacent a first end of said first pipe, said first end portion having a single first circumferential groove on the external surface of said first pipe, said first groove being spaced apart from first end of said first elongated pipe by a predetermined distance;

a second elongated pipe, said second elongated pipe comprising a first end portion adjacent a first end of said second pipe, said first end portion having a single first circumferential groove on the external surface of said second pipe, said second pipe first groove being spaced apart from said first end of said second pipe section by said predetermined distance;

a pipe coupler for receiving and joining said first and said second elongated pipe sections, said pipe coupler comprising:

a single piece cylindrical sleeve, said sleeve comprising first and second end portions, said first end portion receiving said first end of said first elongated pipe and said second end portion receiving said first end of said second elongated pipe, said first end portion having first and second interior circumferential grooves on the interior surface of said sleeve and said second end portion having first and second interior circumferential grooves on said interior surface, said first end portion first circumferential groove being spaced apart from the end of said first end portion by a second predetermined distance, said second end portion first circumferential groove being spaced apart from the end of said second end portion by said second predetermined distance, said first end portion second circumferential groove being spaced apart from said first end portion end by a third predetermined distance, said second end portion second circumferential groove being spaced apart from said second end portion end by said third predetermined distance, said first and second end portion first circumferential grooves each having both sidewalls extending at an incline to said interior surface of said coupler; said coupler further comprising:

a first lock ring carried in said sleeve first end portion first circumferential groove, a second lock ring carried in said sleeve second end portion first circumferential groove, a first seal ring carried in said sleeve first end portion second circumferential groove, a second seal ring carried in said sleeve second end portion second circumferential groove, said first lock ring being movable from a relaxed state to permit insertion of first pipe end portion into said sleeve first end portion to retain said first pipe in locking engagement with said pipe coupler whereby axial movement of said first pipe relative to said pipe coupler causes said first lock ring to engage said inclined surface of first end portion first circumferential groove and a sidewall of said first elongated pipe first circumferential groove, and said first seal ring sealingly engages said first pipe external surface, said second lock ring being movable from a relaxed state to permit insertion of said second pipe end portion into said sleeve second end portion, said second lock ring retaining said second pipe in locking engagement with said pipe coupler whereby axial movement of said second pipe relative to said pipe coupler causes said second lock ring to engage said inclined surface of second end portion first circumferential groove and a sidewall of said second elongated pipe first circumferential groove, and said second seal ring sealingly engages said second pipe external surface;

said first and second lock rings each being irremovable from said coupler while each respective said first and second pipe is inserted into said coupler and wherein:

said sleeve first end portion first groove comprises a first aperture extending through said sleeve and said first lock ring comprises first and second arms extending outwardly through said first aperture, said first and second arms being movable to urge said first lock ring from said relaxed state into engagement with the bottom surface of said first end portion first groove whereby said first pipe first end may be inserted into said sleeve beyond said first lock ring.

2. A system according to claim 1, wherein:

said sleeve second end portion first groove comprises a second aperture extending through said sleeve and said second lock ring comprises a first and second arms extending outwardly through said second aperture, said first and second arms being movable to urge said second lock ring from said relaxed state into engagement with the bottom surface of said second end portion first groove whereby said second pipe first end may be inserted into said sleeve beyond said second lock ring.

3. A system in accordance with claim 1, wherein:

said first and second seal rings are each of generally circular cross-section.

4. A system in accordance with claim 1, wherein:

each of said sleeve first end portions second groove and said sleeve second end portion second groove is of cross-section which conforms to said first seal ring and said second seal ring, respectively.

5. A system in accordance with claim 1, wherein:

each of said first lock ring and second lock ring is of a circular cross-section.

* * * * *